Sept. 30, 1930. S. D. WILEY 1,777,188
PARACHUTE AIRCRAFT FLARE
Filed July 23, 1929 2 Sheets-Sheet 2
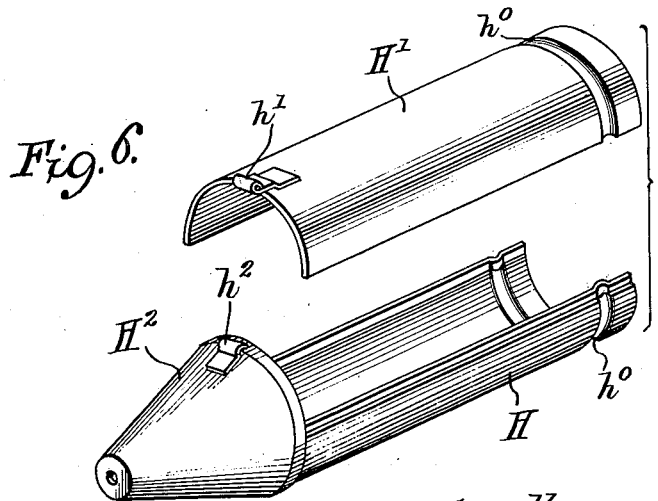
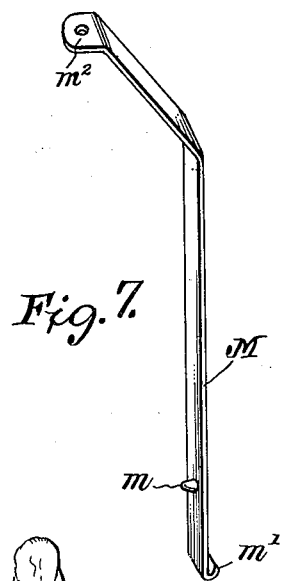
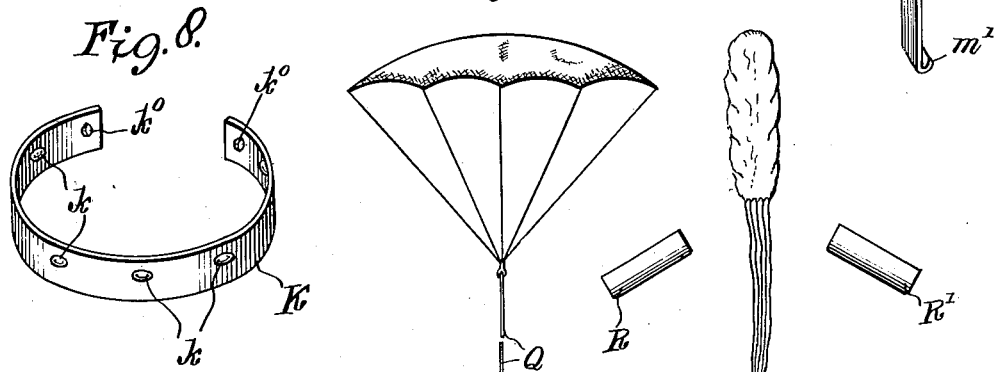
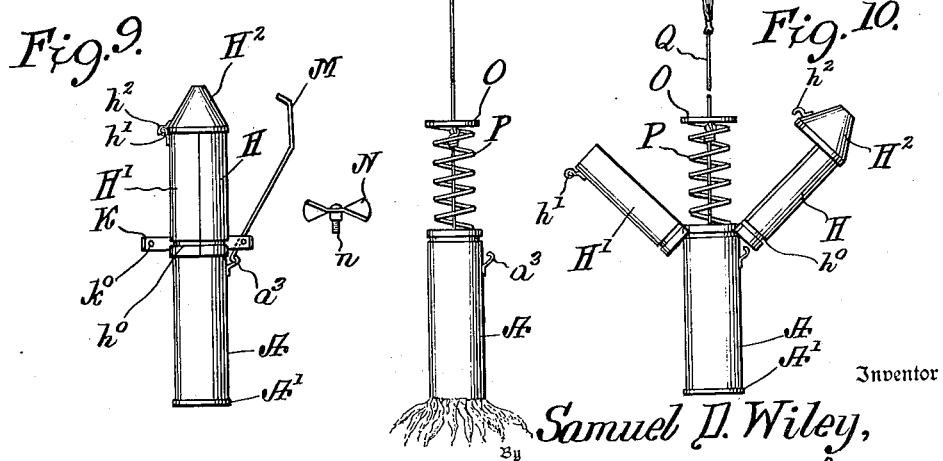
Inventor
Samuel D. Wiley,
By Wilkinson & Giusta
Attorneys.

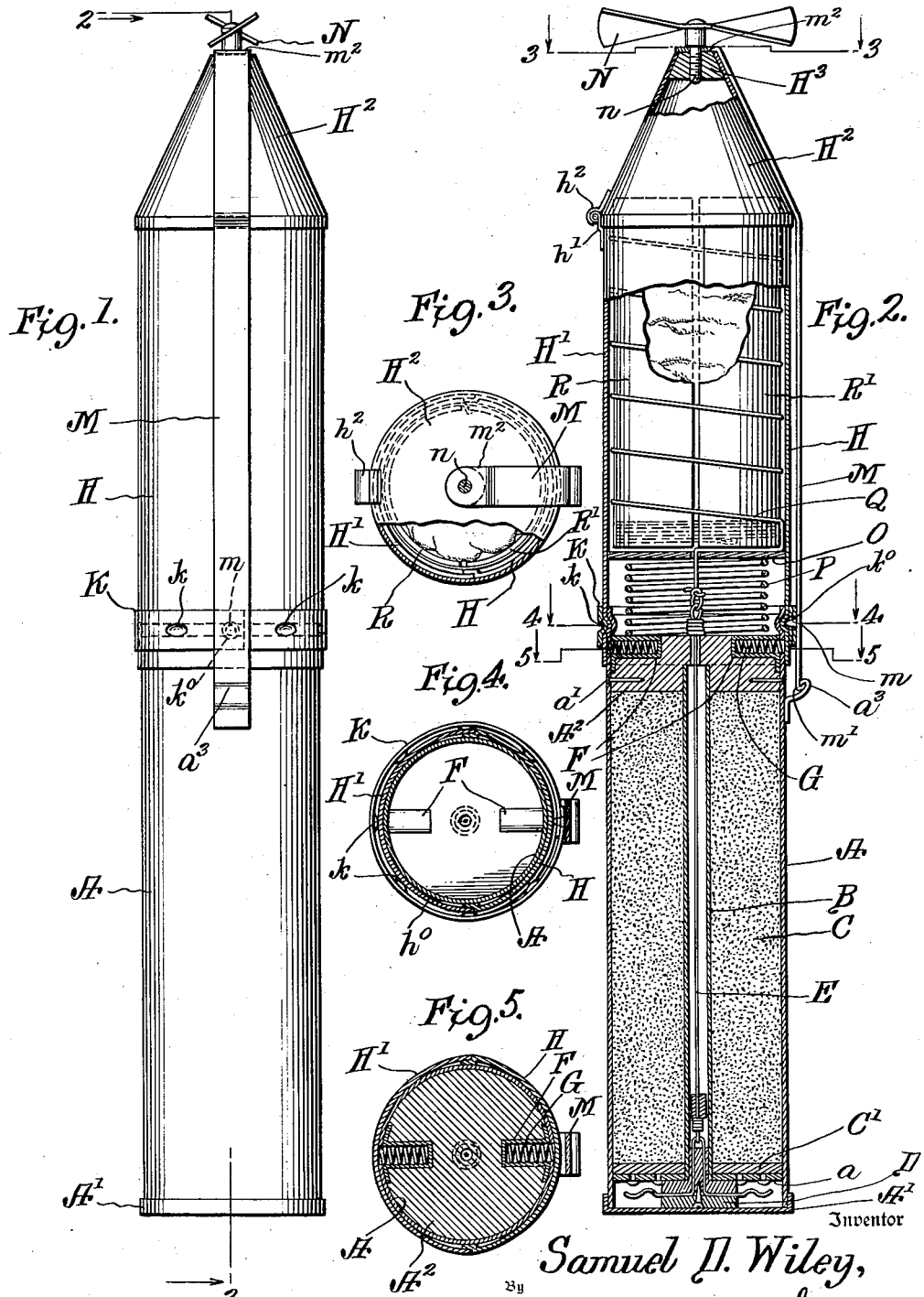

Patented Sept. 30, 1930

1,777,188

UNITED STATES PATENT OFFICE

SAMUEL D. WILEY, OF METUCHEN, NEW JERSEY

PARACHUTE AIRCRAFT FLARE

Application filed July 23, 1929. Serial No. 380,378.

My present invention relates to improvements in aircraft flares, in which the flare is supported by a parachute as it descends gently downwards, and the principal purpose of my invention is to provide a flare in which the container for the parachute may not be released from the parachute until the flare has fallen a predetermined distance through the air, thus essentially protecting the aircraft from accidents, such as are occasioned by the premature ignition of the flare before the flare is well clear of the aircraft.

My present invention relates to parachute flares adapted for use in night flying for illuminating the ground when landing, or for observation of the ground at night by operators of aircraft, or for signalling.

The invention relates particularly to an improvement in the parachute containers of flares whereby the parachute is not released until an appreciable interval of time has elapsed after the flare is dropped from the plane.

The very great advantage in this mechanical delay is the safety feature both in operation and in eliminating the fire hazard which is ever present in the operation of planes that carry flares operating by the opening of the parachute.

My invention will be more fully understood after reference to the accompanying drawings, in which like parts are indicated by similar reference symbols through the several views, and in which Figure 1 is a side elevation of the flare complete, with the parachute container in the closed position, and the flare attached thereto.

Figure 2 shows an axial section along the line 2—2 of Figure 1, looking in the direction of the arrows, parts being shown in elevation.

Figures 3, 4 and 5 show, respectively, sections along the line 3—3, 4—4 and 5—5 of Figure 2, and looking down.

Figure 6 is a detail view showing the two parts of the parachute container as detached from the rest of the apparatus.

Figure 7 is a detail showing the resilient locking strip or lever used to hold together the two parts of the parachute container and to release same at the proper time.

Figure 8 is a detail perspective view showing the resilient binding strip or split band which coacts with the locking strip in holding and releasing the parts.

Figure 9 is a diagrammatic view showing the first stage of the release of the parachute container.

Figure 10 is a diagram showing a later stage of said release, with the parachute as yet unopened, and Figure 11 shows the final stage of the operation of the device, in which the flare supported by the parachute is floating gently downwards, the flare being ignited.

The flare proper used in this apparatus is substantially the same as that shown in the patent to Samuel Wiley, Jr., No. 1,709,644, granted April 16, 1929, and also in my copending application, Ser. No. 373,328, filed June 24, 1929, but only briefly described herein, as the present invention relates more particularly to the manner of housing the parachute and of connecting the same to the flare, and of automatically releasing the parachute after the flare has dropped downwards a predetermined distance from the aircraft, from which it has been projected.

Referring first to the flare proper, A represents the flare container preferably in the form of a cylindrical shell having a central tube B surrounded with a flare composition C. Below this tube is a layer of ignition powder C′ above the perforated head $a$, beneath which is the friction primer D, the lower end of the container A being closed by the cap A′. This friction primer is operated by the wire E connected to the parachute stays, as will be hereafter described.

The upper end of the flare container is closed by the plug $A^2$, which may be of wood or other suitable material, secured to the shell of the container as by means of the nails $a'$. Mounted in this head $A^2$ are two oppositely disposed housings F, in which springs G are held under compression, as shown most clearly in Figure 5. These springs press outwardly on the separable members H and H' of the parachute container.

These two members when assembled form a substantially hollow cylinder, in which the parachute is contained, and the member H is provided with a conical cap H² which is integral with or secured to the member H, and in which the upper end of the member H' projects when the two parts are assembled. These two members H and H' are detachably connected at their upper ends by means of the lug $h'$, which engages the hook $h^2$, as shown most clearly in Figure 6. This hook and lug engagement permits the lower end of the member H' to swing outwards under pressure of the springs G, as will be hereinafter described.

The lower ends of the two members H and H' are held together by the binding strip or split band K, shown in detail in Figure 8. This band has a series of inwardly projecting lugs $k$ stamped out of the same, adapted to engage in the groove $h^0$ near the bottom of the members H and H'. Near its two ends, this binding strip has perforations $k^0$, which perforations are adapted to engage the inwardly projecting lug $m$ of the locking strip or lever M, as shown in detail in Figure 7. This locking strip is made of resilient metal, and at its lower end is hooked, as at $m'$, to engage the catch $a^3$ projecting from the flare container A, as shown at the right of Figure 2. The upper end of this locking strip M is bent, as at $m^2$, to register with the flat top of the cone cap H². This cone cap carries a tapered plug H³, which is internally screw threaded to engage the screw $n$ forming the axis of the propeller N. O, see Figure 2, represents a loose disk beneath which the parachute ejecting spring P is mounted under compression. Above this disk the parachute, with its container, is mounted. The parachute cable Q is wound around the two separable members R and R', in which the parachute is held. The upper end of this cable is attached to the parachute stays in the usual way, and the lower end is attached to the wire E, by means of which the friction primer is ignited when the parachute becomes distended, as will be hereinafter described.

The parts are assembled as follows:

The parachute is first mounted in the separable semi-cylindrical members R and R' and held therein by winding the parachute cable around these members, and then the members H and H', constituting the parachute container, are attached to the flare by means of the split holding ring K, the two ends of this perforated ring being locked together by the lug $m$ of the locking strip M entering the perforations $k^0$. At this time, the hook $m'$ will engage the catch $a^3$, and the upper end of the locking strip will be placed over the plug H³, and the screw shaft $n$ of the propeller N will be screwed down in place. Thus, this locking strip will hold the split band in place and will secure the lower ends of the members H and H' against being pressed outwards by the springs G, and the shaft $n$ will hold the upper end of the locking strip in place. Thus, the parts, when finally assembled, will be in the position shown in Figures 1 and 2. Now when the flare is thrown overboard from the aircraft, the propeller N must perform a predetermined number of revolutions before the upper end of the locking strip N is released. This strip will then swing outwards, as shown in Figure 9, the propeller falling away from it, and the lug $m$ will become disengaged from the perforations $k^0$ of the split ring K; and the springs G will then push the lower ends of the members H and H' clear of the flare, and these members will fall away, as indicated in Figure 10.

Meantime, the spring B will have ejected the parachute, and the heavier flare falling downwards will cause the parts to assume the position shown in Figure 10. As soon as the parachute is ejected, the shells R and R' will be released by the cable Q, and these shells will fall away, as shown in Figure 10; and finally when the parachute opens, it will operate the friction primer and ignite the flare, and the flare will descend gently downwards supported by the parachute.

Thus, it will be seen that there is a safety time interval provided between the time that the parachute is thrown overboard from the aircraft until the propeller unlocks the members of the container and permits the parachute to be ejected. This period of time may be adjusted by varying the length of the screw or changing the pitch of the threads. Obviously, a suitable stop may be provided for the propeller to prevent it from rotating until the flare is thrown overboard. After the members H and H' of the parachute container are released, under the action of the screw propeller, as aforesaid, there will be a still further interval occasioned by the unwinding of the cable from the semi-cylindrical shells R and R'. It will be more convenient to assemble the parachute by using separable shells, such as R and R', but, if desired, other packing means for assembling the parachute in its container may be provided, and I do not mean to limit the invention to this particular construction.

While I have shown a cylindrical container as comprising lightness with strength of construction, it will be obvious that different shapes of container for the flare and parachute may be used. It will also be obvious that various other changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:—

1. In a parachute flare of the character described, the combination with a flare casing containing the flare, of a parachute casing detachably connected thereto, said parachute casing comprising a plurality of separable members, a parachute mounted in said casing, detachable means for holding said members together, and means operable after a predetermined time for releasing said holding means.

2. In a parachute flare of the character described, the combination with a flare casing containing the flare, of a parachute casing detachably connected thereto, said parachute casing comprising a plurality of separable members, a parachute mounted in said casing, detachable means for holding said members together, and a screw propeller, and means controlled thereby operable after a predetermined time, for releasing said holding means.

3. In a parachute flare of the character described, the combination with a flare casing containing the flare, of a parachute casing detachably connected thereto, said parachute casing comprising a pair of separable substantially semi-cylindrical members, a parachute mounted in said casing, detachable means for holding said members together, and means operable after a predetermined time, for releasing said holding means.

4. In a parachute flare of the character described, the combination with a flare casing containing the flare, of a parachute casing detachably connected thereto, said parachute casing comprising a pair of separable substantially semi-cylindrical members, a parachute mounted in said casing, detachable means for holding said members together, and a screw propeller and means controlled thereby operable after a predetermined time, for releasing said holding means.

5. In a parachute flare of the character described, the combination with a flare casing containing the flare, of a parachute casing comprising a plurality of separable members, a parachute mounted in said casing, detachable means for holding said members together and for attaching said members to said flare casing, comprising a split band, and a locking strip, and means operable after a predetermined time for releasing said holding means.

6. In a parachute flare of the character described, the combination with a flare casing containing the flare, of a parachute casing comprising a plurality of separable members, a parachute mounted in said casing, detachable means for holding said members together and for attaching said members to said flare casing, comprising a split band, and a locking strip, and a screw propeller and means controlled thereby after a predetermined time for releasing said holding means.

7. In a parachute flare of the character described, the combination with a flare casing containing the flare, of a parachute casing detachably connected thereto, said parachute casing comprising a plurality of separable members, a parachute mounted in said casing, detachable means for holding said members together, said last mentioned means comprising a split gripping band adapted to attach the lower end of the said members to the flare casing, a resilient locking strip adapted to lock the ends of said clamping band, and means for releasing said locking strip and said band after a predetermined interval of time.

8. In a parachute flare of the character described, the combination with a flare casing containing the flare, of a parachute casing detachably connected thereto, said parachute casing comprising a plurality of separable members, a parachute mounted in said casing, detachable means for holding said members together, said last mentioned means comprising a split gripping band adapted to attach the lower end of the said members to the flare casing, a resilient locking strip adapted to lock the ends of said clamping band, and a screw propeller having its shaft screw threaded, said shaft being adapted to hold said lock strip in place until said propeller has made a predetermined number of revolutions in its travel through the air.

9. In a parachute flare of the character described, the combination with a flare casing containing the flare, of a parachute casing detachably connected thereto, said parachute casing comprising a plurality of separable members, a parachute mounted in said casing, detachable means for holding said members together, said last mentioned means comprising a split gripping band adapted to attach the lower end of the said members to the flare casing, springs mounted in said flare casing and normally tending to disengage the parachute casing therefrom, a resilient locking strip adapted to lock the ends of said clamping band, and a screw propeller having its shaft screw threaded, said shaft being adapted to hold said lock strip in place until said propeller has made a predetermined number of revolutions in its travel through the air.

10. In a parachute flare of the character described, the combination with a flare casing containing the flare, of a parachute casing detachably connected thereto, said parachute casing comprising a plurality of separable members, a parachute mounted in said casing, detachable means for holding said members together, said last mentioned means comprising a split gripping band adapted to attach the lower end of the said members to the flare casing, springs mounted in said flare casing and normally tending to disengage the parachute casing therefrom, a resilient locking strip adapted to lock the ends of said clamping band.

11. In a parachute flare of the character described, the combination with a flare casing containing the flare, of a parachute casing detachably connected thereto, said parachute casing comprising a pair of substantially semi-cylindrical separable members, hinged together near their upper ends, a parachute mounted in said casing, detachable means for holding the lower ends of said members to the flare casing, said last mentioned means comprising a gripping band adapted to attach the lower end of the said members to the flare casing, a resilient locking strip adapted to lock the end of said clamping band, and a screw propeller having its shaft screw threaded, said shaft being adapted to hold said lock strip in place until said propeller has made a predetermined number of revolutions in its travel through the air.

12. In a parachute flare of the character described, the combination with a flare casing containing the flare, of a parachute casing detachably connected thereto, said parachute casing comprising a pair of substantially semi-cylindrical separable members, hinged together near their upper ends, a parachute mounted in said casing, detachable means for holding the lower ends of said members to the flare casing, said last mentioned means comprising a gripping band adapted to attach the lower end of the said members to the flare casing, springs mounted in said flare casing and normally tending to disengage the parachute casing therefrom, a resilient locking strip adapted to lock the end of said clamping band, and a screw propeller having its shaft screw threaded, said shaft being adapted to hold said lock strip in place until said propeller has made a predetermined number of revolutions in its travel through the air.

SAMUEL D. WILEY.